United States Patent [19]

Kurihara et al.

[11] Patent Number: 4,831,612

[45] Date of Patent: May 16, 1989

[54] OPTICAL DISC READING APPARATUS

[75] Inventors: Toshihiko Kurihara; Yoshitsugu Araki; Tadashi Funabashi, all of Saitama, Japan

[73] Assignee: Pioneer Electronic Corporation, Tokyo, Japan

[21] Appl. No.: 180,493

[22] Filed: Apr. 12, 1988

[30] Foreign Application Priority Data

Apr. 24, 1987 [JP] Japan ............................ 62-61473[U]

[51] Int. Cl.⁴ ......................... G11B 19/10; G11B 1/00; G11B 17/04; G11B 21/00

[52] U.S. Cl. .................................. 369/75.2; 350/255; 369/244; 369/256

[58] Field of Search ...................... 369/75.2, 264, 244, 369/256; 360/255

[56] References Cited

U.S. PATENT DOCUMENTS 4,347,596 8/1982 Abe et al. ........................... 369/265

4,680,748 7/1987 Kobayashi ......................... 369/75.2

4,773,255 9/1988 Gijzen et al. ....................... 350/255

*Primary Examiner*—Steven L. Stephan

*Attorney, Agent, or Firm*—Sughrue, Mion, Zinn, Macpeak & Seas

[57] ABSTRACT

An optical disc reading apparatus having a reduced overall height and simplified structure. The disc drive motor is mounted with its output shaft extending downward. A turntable is fixed to the output shaft below the body of the motor. A disc carriage is mounted so as to be movable only in a horizontal direction towards and away from the turntable, and a clamper clamps the disc once it has been conveyed by the disc carriage to the playing position on the turntable. A pickup is mounted below the turntable on the side of a loaded disc opposite both the motor and turntable. At least the objective lens of the optical pickup is lowered away from the turntable when the disc is being loaded to allow free movement of the disc toward the turntable.

2 Claims, 1 Drawing Sheet

11 16 18 13 15 12 19 17 14

OPTICAL DISC READING APPARATUS

BACKGROUND OF THE INVENTION

This present invention relates to improvements to an optical signal disc reading apparatus in which a disc, such as a compact disc or video disc, is loaded on a turntable and an optical pickup reads a digital signal recorded on the disc.

A conventional optical signal disc reading apparatus is shown in FIG. 1 and will now be described.

In this figure, reference numeral 1 denotes a motor, the shaft of which is fixed to a turntable 3.

Reference numeral 5 denotes a disc carriage which receives a disc 6 at a position adjacent the front face of the player. In order to set the disc on the turntable 3, the disc 6 is conveyed until the disc 6 and turntable 3 are aligned, and the disc carriage 5 then lowers the disc 6 onto the turntable 3.

Reference numeral 4 denotes a clamper which is lowered when the disc carriage 5 is lowered to push the disc 6 placed on the turntable 3 against the turntable 3.

Reference numeral 7 denotes a centering hub pushed up by spring 8 and fitted into a central hole in the disc 6 by the pushing operation of the clamper 4 to thereby center the disc 6.

Reference numeral 2 denotes an optical pickup which reads a signal from the disc 6 when the disc is set in place on the turntable and rotated by the motor 1.

The optical pickup 2 and motor 1 are disposed on the same side in the conventional optical signal disc reading apparatus. Therefore, the minimum diameter of the region of the disc 6 from which the pickup 2 can read a signal is larger than the sum of the outer dimension of the motor 1 plus a dimension in the radial direction from the objective lens of the pickup 2.

Therefore, for a disk player for discs having a small minimum signal recording diameter such as a compact disc, the shaft of the motor 1 must be elongated to allow the motor to be mounted in a lower position to provide a space between motor 1 and turntable 3 into which the pickup 2 can enter, as shown in FIG. 1. Therefore, a drawback results in that there is an unavoidable increase in the vertical dimension of the player.

The outer diameter of the motor 1 may be reduced; however, this increases the cost of the motor 1.

Also, since the turntable 3 should not contact the pickup 2 at the outer periphery thereof, the turntable 3 should be reduced in outer diameter. In such a case, if the disc 6 is warped, the warping greatly influences the signal reading process to thereby render playing the disc difficult.

SUMMARY OF THE INVENTION

The present invention is intended to eliminate the above-described drawbacks of the conventional optical signal disc reading apparatus.

More specifically, objects of the invention are to reduce the vertical dimension of the player, to reduce the cost of the motor, to drive the disc without unwanted movement, and to move the disc carriage only horizontally in spite of an increase in the outer diameter of the motor and turntable to thereby simplify the mechanism.

In order to achieve the above and other objects, briefly, the disc carriage is made to move only horizontally to carry a disc, and the clamper is lifted to push up and set the disc on the turntable. The optical pickup is provided opposite the turntable, and at least the objective lens is moved to prevent damage thereto when the disc is being moved by the carriage.

DESCRIPTION OF THE PREFERRED EMBODIMENTS

Figure 1:
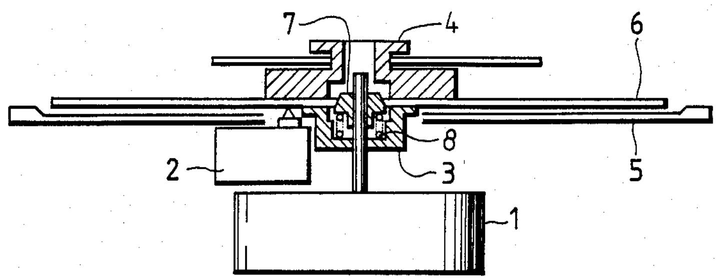
FIG. 1 is a cross-sectional view of a conventional optical signal disc reading apparatus.
Figure 2:
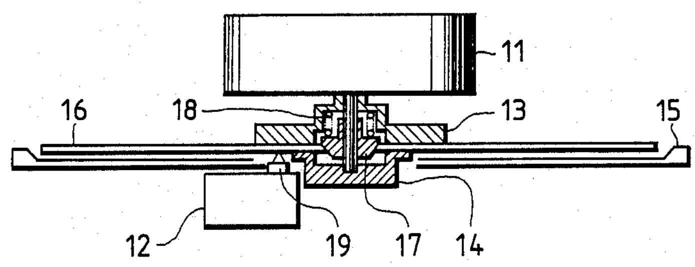
FIG. 2 is a cross-sectional view of a preferred embodiment of an optical disc reading apparatus.

A preferred embodiment of the present invention will now be described with reference to FIGS. 2 and 3.

Reference numeral 11 denotes a motor which is mounted such that its output shaft extends downwardly. The motor shaft is fixed to a turntable 13, a centering hub 17 is attached thereto which is biased downwardly by a spring 18.

Reference numeral 15 denotes a disc carriage which receives and carries a disc 16 from a position outside the player to a position where the central hole in the disc 16 is aligned with the centering hub 17.

Reference numeral 14 denotes a clamper which pushes up the disc 16 against turntable 13 and fits the hub 17 into the centering hole in the disc 16 to thereby center the disc 16.

Reference numeral 12 denotes an optical pickup, the objective lens 19 of which is disposed opposite to the turntable 13 and which is vertically movable by an excitation coil or the like to allow the objective lens to be drawn into the body of the pickup 12.

To commence a playing operation, a disc 16 is placed on the disc carriage 15, which is then moved horizontally manually or automatically until the center hole in the disc 16 is aligned with the centering hub 17.

Figure 3:
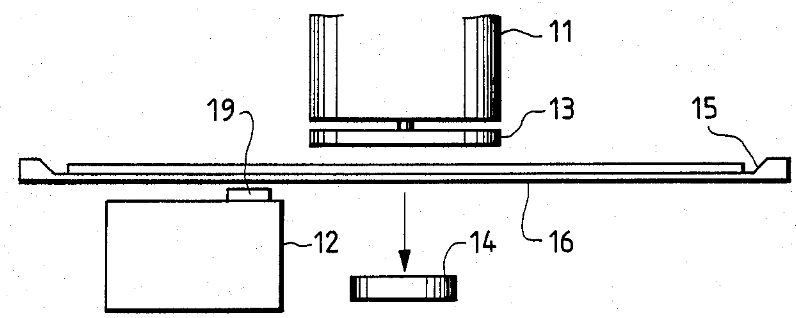
FIG. 3 shows the apparatus of FIG. 2 with a disc loaded.

At this time, the objective lens 19 of the pickup 12 is drawn into the body of the pickup 12, as shown in FIG. 3, so that the clearance between the turntable 13 and the objective lens 19 is increased to thereby not hinder the movement of disc carriage 15.

The clamper 14 is then lifted, and the disc 16 on the clamper 14 is fitted onto the centering hub 17 to thereby center the disc 16. Thereafter, the clamper 14 continues to push the centering hub 17 against the spring 18 to thereby push the disc 16 against the turntable 13.

The objective lens 19 of the pickup 12 is then moved to a position where the distance between the objective lens 19 and the disc 16 is equal to a focal distance of about 1.5–2 millimeters, the motor 11 is rotated to rotate the disc 16, and the pickup 12 reads a signal from the disc 16 to commence a playing operation.

In this embodiment, the objective lens 19 is drawn into the body of the pickup by exciting a coil. However, another driving method may be used. In the case where drawing the objective lens 19 into the body of the pickup is insufficient to form a sufficient clearance between the objective lens 19 and turntable 13, the entire pickup 12 may be lowered.

As described above, according to the present invention, the disc carriage is moved along horizontally and is not required to move vertically. Hence, the loading mechanism which carries the disc is simplified.

Because the pickup is disposed on the opposite side of the disc from the motor and turntable, increasing the motor and turntable diameter does not hinder the reading of the signal from the minimum radius portion of the disc by the pickup.

Moreover, increasing the motor diameter does not increase the cost of the motor, and no increase in the vertical dimension of the player is caused by an increase in the distance between the motor and turntable.

Further, by increasing the turntable diameter, the influence of possible warping in the disc is reduced, and the angle between the outgoing light from the objective lens of the pickup and the disc surface is maintained at a right angle to thereby reduce errors in signal reproduction.

What is claimed is:

1. An optical disc reading apparatus comprising:

a motor having an output shaft extending from said motor in a first direction, the first direction defining the downward direction;

a turntable fixed to said output shaft below said motor;

a disc carriage movable into and out of a predetermined position below said turntable, said disc carriage being only movable in a horizontal direction with respect to said turntable;

a movable clamper for clamping a disc supported by said disc carriage to said turntable, said movable clamper being positioned below said turntable when said disc carriage moves into and out of said predetermined position, and being movable upwards towards said turntable for clamping said disc to said turntable when the disc is moved to the predetermined position; and an optical pickup provided below said turntable and having an objective lens which is movably mounted to said optical pickup to move away from said turntable when said disc carriage is conveying the disc into and out of the predetermined position, thereby providing a sufficient clearance between said turntable and said optical pickup for said disc carriage.

2. The optical disc reading apparatus of claim 1, wherein the whole of said optical pickup is movably mounted to move said pickup away from said turntable when said disc carriage is conveying the disc into and out of the predetermined position.

* * * * *